US009651144B2

(12) United States Patent
Long et al.

(10) Patent No.: US 9,651,144 B2
(45) Date of Patent: May 16, 2017

(54) METHOD OF CONTROLLING A HYDRAULIC PRESSURIZATION SYSTEM OF A TRANSMISSION

(71) Applicant: Allison Transmission, Inc., Indianapolis, IN (US)

(72) Inventors: Charles F. Long, Avon, IN (US); Jeffrey K. Runde, Fishers, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 137 days.

(21) Appl. No.: 13/968,789

(22) Filed: Aug. 16, 2013

(65) Prior Publication Data
US 2014/0121921 A1    May 1, 2014

Related U.S. Application Data

(60) Provisional application No. 61/720,673, filed on Oct. 31, 2012.

(51) Int. Cl.
*F16H 59/44* (2006.01)
*F16H 61/00* (2006.01)
*F16H 59/68* (2006.01)

(52) U.S. Cl.
CPC ......... *F16H 61/0031* (2013.01); *F16H 59/44* (2013.01); *F16H 59/68* (2013.01); *F16H 61/0021* (2013.01); *F16H 2059/683* (2013.01); *F16H 2312/14* (2013.01); *Y10T 74/20024* (2015.01)

(58) Field of Classification Search
None
See application file for complete search history.

(56) References Cited

U.S. PATENT DOCUMENTS

| | | |
|---|---|---|
| 6,258,008 B1 | 7/2001 | Tabata et al. |
| 6,371,883 B1 | 4/2002 | Eguchi |
| 6,390,947 B1 | 5/2002 | Aoki et al. |
| 6,404,072 B2 | 6/2002 | Onoyama et al. |
| 6,463,375 B2 | 10/2002 | Matsubara et al. |
| 6,526,931 B1 | 3/2003 | Vilou |
| 6,564,765 B2 | 5/2003 | Kuroda et al. |

(Continued)

FOREIGN PATENT DOCUMENTS

EP    2055997 A2    5/2009

OTHER PUBLICATIONS

European Search Report, Jul. 14, 2016, 7 pgs.

*Primary Examiner* — John R Olszewski
*Assistant Examiner* — James M McPherson
(74) *Attorney, Agent, or Firm* — Taft Stettinius & Hollister LLP; Stephen F. Rost

(57) ABSTRACT

The present disclosure relates to a method of controlling a vehicle. The method includes receiving a signal indicative of the vehicle being in a stop condition or in the process of stopping. The method also includes activating an auxiliary hydraulic pressurization system in response to the signal and regulating a hydraulic pressure in a hydraulic control system of a transmission. A drive unit is disabled such that a main pump of the hydraulic control system discontinues providing hydraulic pressure to the hydraulic control system. The hydraulic pressure is maintained at a hold pressure in the hydraulic control system by the auxiliary hydraulic pressurization system.

23 Claims, 8 Drawing Sheets

(56) References Cited

U.S. PATENT DOCUMENTS

| | | |
|---|---|---|
| 6,687,580 B2 | 2/2004 | Suzuki et al. |
| 6,709,362 B2 | 3/2004 | Tomohiro et al. |
| 6,716,138 B2 | 4/2004 | Matsubara et al. |
| 6,730,000 B1 | 5/2004 | Leising et al. |
| 6,736,755 B2 | 5/2004 | Kato |
| 6,760,655 B2 | 7/2004 | Matsubara et al. |
| 6,913,588 B2 | 7/2005 | Weitzel et al. |
| 6,997,275 B2 | 2/2006 | Mesiti et al. |
| 7,036,477 B1 | 5/2006 | Thompson et al. |
| 7,041,030 B2 | 5/2006 | Kuroda et al. |
| 7,146,959 B2 | 12/2006 | Thompson et al. |
| 7,347,175 B2 | 3/2008 | Lupo et al. |
| 7,524,266 B2 | 4/2009 | Nobumoto |
| 7,617,808 B2 | 11/2009 | Aswani et al. |
| 7,657,350 B2 | 2/2010 | Moran |
| 7,681,546 B2 | 3/2010 | Lecole et al. |
| 7,689,330 B2 | 3/2010 | Moran |
| 7,689,331 B2 | 3/2010 | Moran |
| 7,779,958 B2 | 8/2010 | Kitano et al. |
| 7,828,696 B2 | 11/2010 | Choi |
| 8,057,355 B2 | 11/2011 | Tryon et al. |
| 8,062,171 B2 | 11/2011 | Soliman |
| 8,170,762 B2 | 5/2012 | Foster et al. |
| 8,187,147 B2 | 5/2012 | Tyron et al. |
| 8,192,327 B2 | 6/2012 | Gibson et al. |
| 8,192,328 B2 | 6/2012 | Nedorezov |
| 8,210,978 B2 | 7/2012 | Shirasaka et al. |
| 8,216,112 B2 | 7/2012 | Gibson et al. |
| 8,241,176 B2 | 8/2012 | Soliman et al. |
| 8,244,449 B2 | 8/2012 | Mizuno |
| 8,494,730 B2 * | 7/2013 | Yoshikawa .................. 701/51 |
| 2004/0029677 A1 | 2/2004 | Mori et al. |
| 2007/0087894 A1 | 4/2007 | Tsuneyoshi et al. |
| 2009/0112421 A1 * | 4/2009 | Sah et al. .................. 701/59 |
| 2009/0241883 A1 | 10/2009 | Nagoshi et al. |
| 2009/0247353 A1 | 10/2009 | Tyron et al. |
| 2010/0018194 A1 * | 1/2010 | Kovach ............... F16H 47/02 60/327 |
| 2010/0076634 A1 | 3/2010 | Brigham |
| 2010/0174459 A1 | 7/2010 | Gibson et al. |
| 2010/0174460 A1 | 7/2010 | Gibson et al. |
| 2010/0228452 A1 | 9/2010 | Hoyosa et al. |
| 2011/0275478 A1 | 11/2011 | Cuppers et al. |
| 2011/0319227 A1 | 12/2011 | Kamada et al. |
| 2012/0010044 A1 | 1/2012 | Gibson et al. |
| 2012/0010045 A1 | 1/2012 | Nedorezov |
| 2012/0011961 A1 | 1/2012 | Frait et al. |
| 2012/0197503 A1 | 8/2012 | McGee et al. |
| 2012/0202648 A1 | 8/2012 | Kikura et al. |

\* cited by examiner

METHOD OF CONTROLLING A HYDRAULIC PRESSURIZATION SYSTEM OF A TRANSMISSION

RELATED APPLICATIONS

This application claims the benefit of U.S. Provisional Patent Application No. 61/720,673, filed Oct. 31, 2012, which is hereby incorporated by reference in its entirety.

TECHNICAL FIELD

The present disclosure relates generally to motor vehicle transmissions. More particularly, the present disclosure relates to hydraulic systems included in motor vehicle transmissions.

BACKGROUND

Transmissions are used in vehicles to transfer torque from a drive unit to a vehicle load. For example, many transmissions transfer the torque from a vehicle engine to a vehicle load produced at the interface of the vehicle's wheels when a vehicle is being driven along a road. Typical transmissions include a gear train that is reconfigurable among a number of gear ratios to establish a particular rotational drive ratio between the vehicle engine and the vehicle load.

Some transmissions include hydraulic control systems configured to set the gear ratio of the gear train. Hydraulic control systems may include hydraulic circuits operated by a controller to engage and disengage clutches included in the circuit to set the gear ratio of the gear train. The hydraulic circuit is typically pressurized by a main pump that is mechanically driven by the vehicle engine when the vehicle engine is running. Sometimes, the hydraulic circuit will lose pressure when the main pump is not being driven and the hydraulic circuit may not be able to maintain a selected gear ratio when the vehicle engine is not running.

SUMMARY

According to one embodiment of the present disclosure, a method is provided for controlling a vehicle. The method includes providing a drive unit and a drive unit controller for controlling the drive unit; providing a transmission, a transmission controller for controlling the transmission, a hydraulic control system of the transmission, a main pump of the hydraulic control system, and an auxiliary hydraulic pressurization system; receiving a signal indicative of the vehicle being in a stop condition or in the process of stopping; activating the auxiliary hydraulic pressurization system in response to the signal; regulating a hydraulic pressure in the hydraulic control system of the transmission; disabling the drive unit, where the disabling of the drive unit induces a main pump of the hydraulic control system to stop providing hydraulic pressure to the hydraulic control system; and maintaining the hydraulic pressure in the hydraulic control system at a hold pressure with the auxiliary hydraulic pressurization system.

In one aspect, the method includes performing one or more conditional determinations before activating the auxiliary hydraulic pressurization system. In another aspect, the performing step includes determining if an energy storage unit of the vehicle comprises sufficient charge; and determining if the transmission controller can request to the drive unit controller to disable the drive unit. In yet another aspect, the method includes providing a set of executable instructions in the transmission controller, the set of executable instructions including a reduced engine load at stop process; determining that the one or more conditional determinations is not satisfied; enabling the reduced engine load at stop process; and executing the reduced engine load at stop process.

In a different aspect, the method includes activating a solenoid valve of the hydraulic control system to reduce the hydraulic pressure in the hydraulic control system. In a further aspect, the solenoid valve is activated before the drive unit is disabled. In yet a further aspect, the method includes requesting a clutch to be filled with hydraulic pressure from the hydraulic control system; and applying at least partially the clutch with hydraulic pressure to substantially lock an output of the transmission. In another aspect, the method includes receiving a second signal indicative of the vehicle starting; and enabling the drive unit to drive a main pump of the transmission. In an alternative embodiment, the method comprises deactivating the auxiliary hydraulic pressurization system after the drive unit is enabled.

According to another embodiment, a method is provided for controlling a transmission of a vehicle. The method includes providing a drive unit for powering the vehicle, and a drive unit controller for controlling the drive unit; providing a transmission controller for controlling the transmission, a hydraulic control system including a main pump and a hydraulic control circuit, a plurality of clutches for providing a plurality of selectable gear or speed ratios, and an auxiliary hydraulic pressurization system; providing a first set and a second set of executable instructions stored in a memory unit of the transmission controller, the first set of executable instructions related to an engine start-stop control process and the second set of executable instructions related to a reduced engine load at stop control process; receiving a signal indicative of the vehicle being in a stop condition or coming to a stop condition; determining if one or more conditions satisfy one or more predefined thresholds; enabling either the first set or second set of executable instructions based on the result of the determining step; wherein, if the first set of executable instructions is enabled: activating the auxiliary hydraulic pressurization system in response to the signal; regulating a hydraulic pressure in the hydraulic control system of the transmission; disabling the drive unit, where the disabling of the drive unit induces a main pump of the hydraulic control system to stop providing hydraulic pressure to the hydraulic control system; and maintaining the hydraulic pressure in the hydraulic control system at a hold pressure with the auxiliary hydraulic pressurization system.

In one aspect, the method includes providing hydraulic pressure to at least two of the plurality of clutches when the drive unit is disabled. In a second aspect, the method includes requesting another of the plurality of clutches to be at least partially filled with hydraulic pressure before the drive unit is disabled; and substantially locking an output of the vehicle with at least three of the plurality of clutches receiving hydraulic pressure, where the hydraulic pressure of at least two of the plurality of clutches is greater than the hydraulic pressure of the at least partially filled clutch. In a third aspect, the determining step includes determining if an energy storage unit of the vehicle comprises sufficient charge; and determining if the transmission controller can request to the drive unit controller to disable the drive unit.

In a fourth aspect, the method includes activating a solenoid valve of the hydraulic control system to reduce the hydraulic pressure in the hydraulic control system before the drive unit is disabled. In a fifth aspect, the solenoid valve is activated before the auxiliary hydraulic pressurization system is activated. In a sixth aspect, the method includes receiving a second signal indicative of the vehicle starting; and enabling the drive unit to drive a main pump of the transmission. In another aspect, the method includes deactivating the auxiliary hydraulic pressurization system after the drive unit is enabled.

In a different aspect, the method includes disabling the transmission controller from executing the first set of executable instructions. In a further aspect, the method includes providing an energy storage unit electrically coupled to the drive unit; receiving a charge signal from a sensor detecting a charge status of the energy storage unit; comparing the charge signal to a charge threshold to determine if the energy storage unit has sufficient charge to power the auxiliary hydraulic pressurization system.

In yet a further aspect, if the second set of executable instructions is enabled, the method includes requesting an unfilled clutch to be at least partially filled with hydraulic pressure, where the unfilled clutch comprises one of the plurality of clutches; maintaining the drive unit in an on state and the auxiliary hydraulic pressurization system in a deactivated state; requesting a decrease of hydraulic pressure in a filled clutch, where the filled clutch is one of at least two of the plurality of clutches that is filled prior to the receiving step; and decreasing the hydraulic pressure in the filled clutch until the hydraulic pressure of the filled clutch is less than the hydraulic pressure of the previously unfilled clutch.

In a further embodiment of the present disclosure, a powered vehicle includes a drive unit having an on state and an off state, where in the drive state the drive unit provides rotational power; a transmission operably coupled to the drive unit including a hydraulic control system and a plurality of selectably engageable clutches, the hydraulic control system including a hydraulic control circuit and a main pump driven by the drive unit when the drive unit is in the on state to produce hydraulic pressure in the hydraulic control circuit; a controller for controlling the transmission, the controller including a memory unit and a processor, where the controller is disposed in electrical communication with the drive unit and the hydraulic control system; and an auxiliary hydraulic pressurization system coupled to the hydraulic control circuit, the auxiliary hydraulic pressurization system adapted to produce hydraulic pressure in the hydraulic control circuit when the drive unit is in the off state; wherein the memory unit of the controller includes a set of instructions stored therein which are executable by the controller to receive a signal indicative of the drive unit being in a stop condition, activate the auxiliary hydraulic pressurization system in response to the signal, regulate the hydraulic pressure in the hydraulic control system of the transmission, disable the drive unit to the off state, and maintain the hydraulic pressure in the hydraulic control system at a hold pressure with the auxiliary hydraulic pressurization system.

In one aspect, the powered vehicle includes an energy storage unit for powering the auxiliary hydraulic pressurization system. In a second aspect, the set of instructions stored in the memory unit include instructions executable by the controller to receive a charge status of the energy storage unit and determine if the charge status exceeds a charge threshold to enable the auxiliary hydraulic pressurization system to be activated. In a third aspect, the powered vehicle includes a solenoid valve of the hydraulic control circuit, the solenoid valve being actuable to reduce the hydraulic pressure in the hydraulic control circuit; wherein, the set of instructions stored in the memory unit include instructions executable by the controller to actuate the solenoid valve before the auxiliary hydraulic pressurization is activated. In another aspect, the set of instructions comprises a second set of instructions related to a reduced engine load at stop process, the second set of instructions stored in the memory unit and being executable by the controller when at least one precondition is not satisfied after the controller receives the signal indicative of the drive unit being in a stop condition.

BRIEF DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
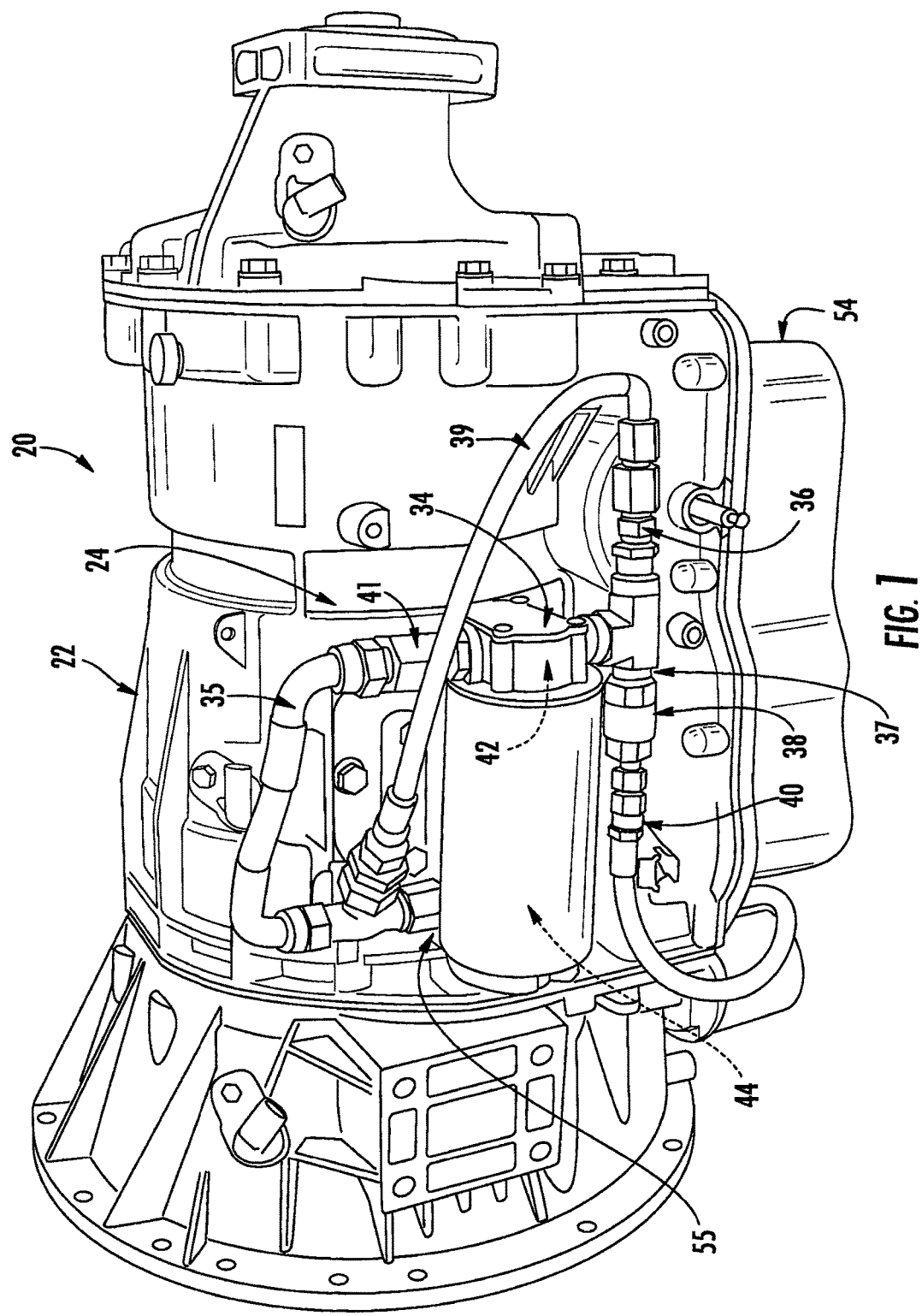
FIG. 1 is a perspective view of a transmission unit including a transmission and an auxiliary hydraulic pressurization system mounted to the transmission.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
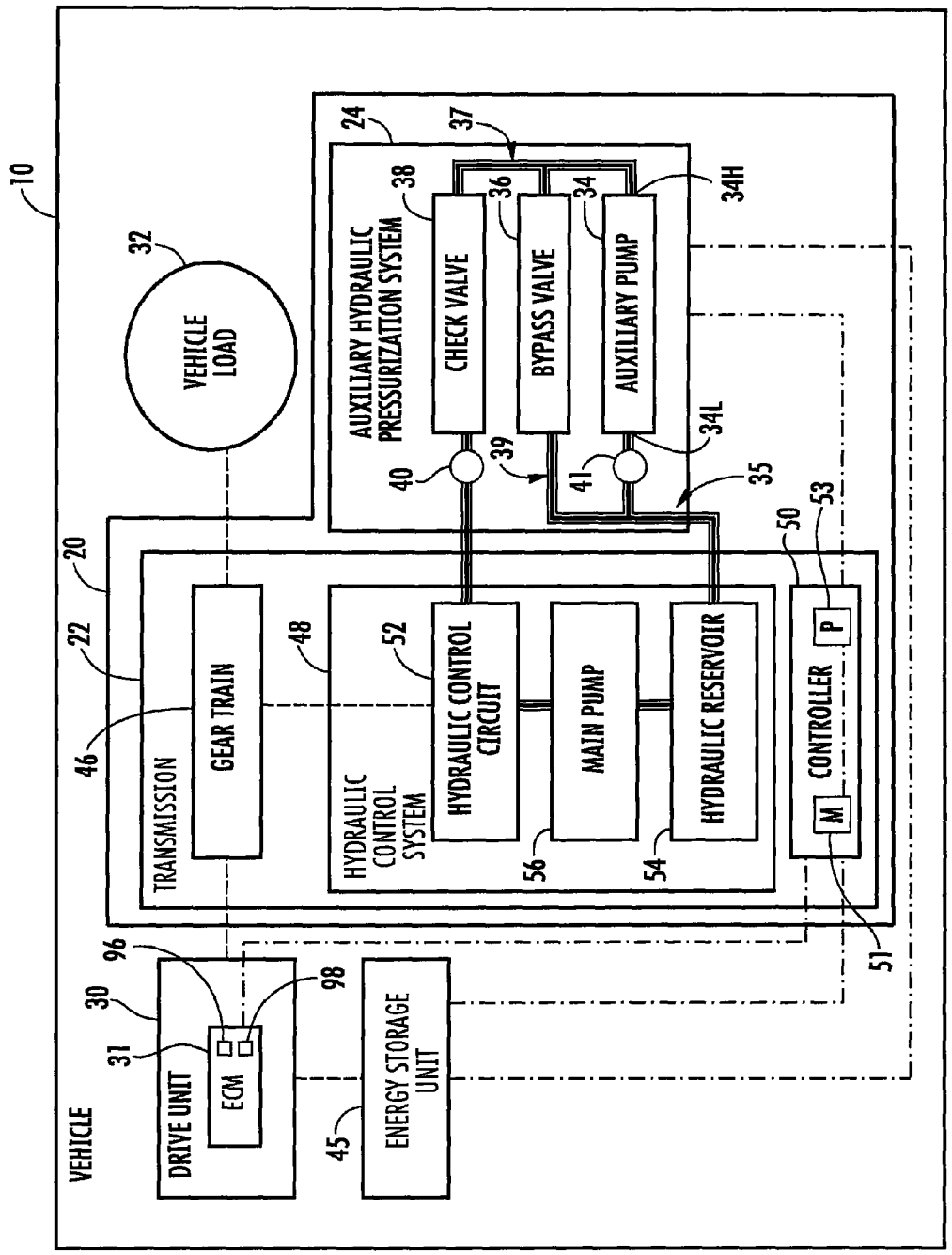
FIG. 2 is a diagrammatic view of a vehicle including a drive unit and the transmission unit of FIG. 1 showing that the drive unit and the transmission unit cooperate to drive a vehicle load.

Referring to FIGS. 1 and 2, in one embodiment, a transmission unit 20 adapted for use in a vehicle 10 includes a transmission 22 and an auxiliary hydraulic pressurization system 24 mounted to the transmission 22. The transmission 22 is configured to transmit torque from a drive unit 30 to drive a vehicle load 32 (see FIG. 2) while the drive unit 30 is on (or running). The auxiliary hydraulic pressurization system 24 is configured to maintain engagement of the transmission 22 between the drive unit 30 and the vehicle load 32 when the drive unit 30 is turned off (or shut down). Thus, freewheeling of the vehicle load 32 and movement of the vehicle 10 is resisted when the drive unit 30 is off and, as such, the drive unit 30 may be turned off when the vehicle 10 is making a short stop (such as a at red light) to thereby save fuel during a trip without the risk of vehicle roll.

The auxiliary hydraulic pressurization system 24 may be mounted to a transmission 22 as part of new transmission unit 20 construction or may be added to an existing transmission 22 to provide a retrofitted transmission unit 20 in the field as suggested in FIG. 1. The auxiliary hydraulic pressurization system 24 illustratively includes an auxiliary pump 34, an optional bypass valve 36, and a check valve 38 mounted to the transmission 22 as shown in FIG. 1. The auxiliary pump 34 is illustratively powered when the drive unit 30 is off. The bypass valve 36 is configured to prevent the auxiliary pump 34 from providing hydraulic fluid to the transmission 22 at a pressure greater than a threshold bypass pressure by bypassing any over-threshold flow from a high-pressure side 34H to a low pressure side 34L of the auxiliary pump 34. In the illustrative embodiment, the threshold bypass pressure is about 48 pounds per square inch (psi) but in other embodiments may be higher or lower depending on hydraulic fluid demand when the drive unit 30 is off and/or other criteria. In a related aspect, a pressure regulator (e.g., valve) may also be used as a bypass in the system 24. The check valve 38 is arranged to block back flow from the transmission 22 through the bypass valve 36 and the auxiliary pump 34 to prevent damage to the auxiliary pump 34.

In the illustrative embodiment, the auxiliary hydraulic pressurization system 24 also includes an optional pressure sensor 40 and, in some embodiments, an optional filter 41 as shown in FIGS. 1 and 2. The pressure sensor 40 is configured to detect the pressure of hydraulic fluid provided to the transmission 22 by the auxiliary pump 34. As will be described below, pressures switches internally disposed within the transmission 22 may further be used for diagnostic purposes. The auxiliary pump 34 may be controlled during operation of the auxiliary hydraulic pressurization system 24 based in part on signals produced by the pressure sensor 40 as further described herein. The filter 41 is configured to clean fluid entering the auxiliary pump 34 from the reservoir 54. In some embodiments, the filter 41 is used in conjunction with an internal filter (not shown) included in the hydraulic control system 48.

The auxiliary pump 34 is illustratively an electrically driven pump with a pump element 42 and a motor 44 coupled to the pump element 42 as shown in FIG. 1. In one particular embodiment, for example, the auxiliary pump 34 is embodied as a twelve volt Model GP-612 electric gear pump, which is commercially available from http://www.enginegearonline.com. Of course, in other embodiments, the auxiliary pump 34 may be embodied as other types of pumps. For example, in some embodiments, the auxiliary pump 34 may be adapted to be driven by compressed air, pressurized oil, or another form of stored energy.

Turning to FIG. 2, in the illustrative embodiment, the vehicle 10 includes the transmission unit 20, the drive unit 30, and an energy storage unit 45. The transmission unit 20 is shown to include the transmission 22 and the auxiliary hydraulic pressurization system 24 coupled to the transmission 22. The drive unit 30 is illustratively an internal combustion engine including an engine control module (ECM) 31 configured to control the operation of the drive unit 30. The energy storage unit 45 is illustratively embodied as a vehicle battery. In one instance, the energy storage unit 45 is a 12-volt battery that is electrically connected to an alternator. The energy storage unit 45 is electrically coupled to the drive unit 30 to be charged when the drive unit 30 is on and is electrically coupled to the auxiliary hydraulic pressurization system 24 to provide electrical energy to the auxiliary pump 34 when the drive unit 30 is off.

The transmission 22 illustratively includes a gear train 46, a hydraulic control system 48, and a controller 50 as shown diagrammatically in FIG. 2. The gear train 46 is reconfigurable among a plurality of gear ratios to transmit torque from the drive unit 30 to the vehicle load 32. In an alternative aspect, the gear train 46 may be reconfigurable among a plurality of speed ratios (e.g., in a continuously-variable transmission, an infinitely-variable transmission, etc.). The hydraulic control system 48 is configured to set the gear train 46 in one of the gear ratios or speed ratios as selected by the controller 50. The controller 50 is coupled to the engine control module 31, the hydraulic control system 48, and to the auxiliary hydraulic pressurization system 24 as shown in FIG. 2. The controller 50 is configured to select a gear ratio or speed ratio for the gear train 46 and to direct operation of the auxiliary hydraulic pressurization system 24 based, at least in part, on information from the engine control module 31.

The hydraulic control system 48 includes a hydraulic circuit 52, a hydraulic reservoir 54, and a main pump 56 as shown in FIG. 2. The hydraulic circuit 52 is configured to set the gear train 46 in one of the gear ratios or speed ratios as selected by the controller 50 by operating a plurality of valves to engage and disengage a plurality of clutches (shown in FIG. 3). The hydraulic reservoir 54 stores hydraulic fluid for use in the hydraulic circuit 52. The hydraulic reservoir 54 is coupled to the hydraulic circuit 52 through the main pump 56 to establish a main path for pressurized fluid to reach the hydraulic circuit 52. The hydraulic reservoir 54 is also coupled to the hydraulic circuit 52 through the auxiliary hydraulic pressurization system 24 to establish an auxiliary path for fluid provided to the hydraulic circuit 52. The main pump 56 is mechanically driven by the drive unit 30 to supply pressurized hydraulic fluid from the hydraulic reservoir 54 to the hydraulic circuit 52 when the drive unit 30 is on.

The controller 50 illustratively includes a memory 51 and a processor 53 coupled to the memory 51 and configured to perform instructions stored in the memory 51. In some embodiments, the controller 50 may be included in the auxiliary hydraulic pressurization system 24, included in the engine control module 31, or may be formed from a plurality of control circuits located throughout the vehicle 10.

Figure 3:
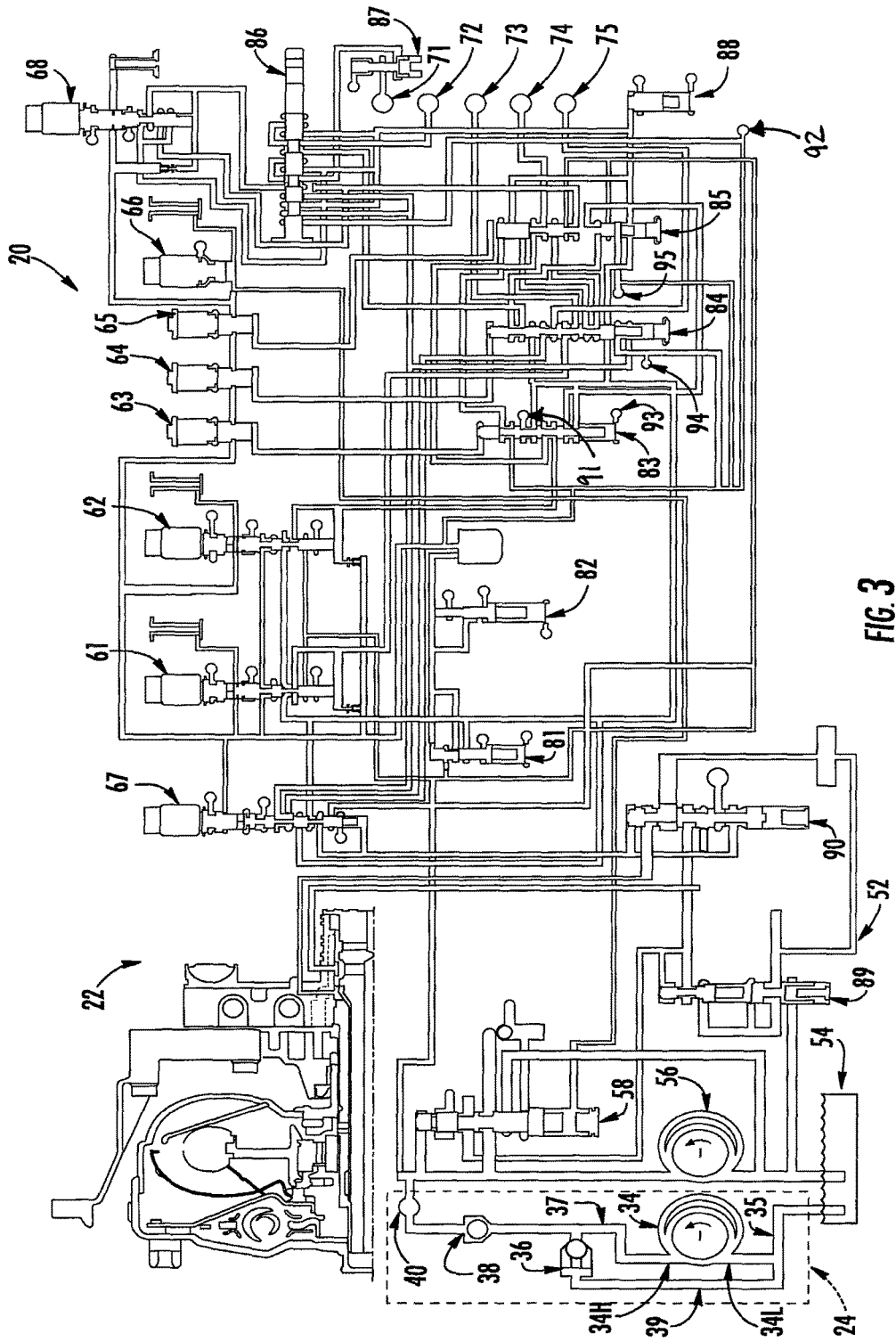
FIG. 3 is a detailed diagrammatic view of the transmission unit of FIG. 1 showing the auxiliary hydraulic pressurization system hydraulically coupled to the transmission around a main pump included in the transmission so that the auxiliary hydraulic pressurization system is configured to maintain hydraulic pressurization of the hydraulic control system when the main pump of the transmission is turned off, for example, when the drive unit is in an off state.

Referring now to FIG. 3, a detailed hydraulic diagram of the auxiliary hydraulic pressurization system 24 and the hydraulic control system 48 included in the transmission unit 20 is shown. As shown in FIG. 3, the auxiliary hydraulic pressurization system 24 is coupled to the hydraulic control system 48 by a low pressure line 35, a high pressure line 37, and a bypass line 39. In particular, the low pressure line 35 fluidly couples the hydraulic reservoir 54 of the hydraulic control system 48 to the low side 34L of the auxiliary pump 34. For example, in the illustrative embodiment of FIG. 1, the low pressure line 35 is plumbed into a dip stick port 55 of the transmission 22. The high pressure line 37 fluidly couples the high side 34H of the auxiliary pump 34 to the hydraulic circuit 52 of the hydraulic control system 48. Both the check valve 38 and the pressure sensor 40 are fluidly coupled in-line with, or otherwise to, the high pressure line 37. The bypass line 39 fluidly couples the low pressure line 35 to the high pressure line 37. The bypass valve 36 is fluidly coupled in-line with, or otherwise to, the bypass line 39 and cooperates therewith to establish a bypass path. The bypass path is typically closed, except for the condition in which an excessive pressure is developed in the high pressure line 37, which resultantly causes the bypass valve 36 to open.

As shown in FIG. 3, the hydraulic circuit 52 also includes an internal main pressure regulator 58 (also known as a line pressure regulator). The regulator 58 is illustratively configured to regulate flow through the regulator 58 below a regulation pressure. Excess flow above the regulation pressure is diverted by the regulator 58 from being used to set the hydraulic circuit 52 to one or more overflow components included in the hydraulic circuit 52 (e.g. to a conditioner, a cooler, and a loop included in the hydraulic circuit 52). The regulator 58 is fluidly coupled to the hydraulic reservoir 54, the main pump 56, and to the auxiliary hydraulic pressurization system 24 as also shown in FIG. 3. The regulator 58 is electrically coupled to the controller 50, and the controller 50 may operate the regulator 58 to set the regulation pressure.

In the illustrative embodiment, the controller 50 may adjust the regulation pressure of the regulator 58 to about 48 psi when the drive unit 30 is turned off when the vehicle 10 is at a stop, typically by lowering the regulation pressure from a greater value used during normal operation. In other embodiments, the controller 50 may adjust the regulator 58 to other regulation pressures. In some such embodiments, the regulator 58 may be used in place of the bypass valve 36 and, in such embodiments, bypass valve 36 may not be included in the auxiliary hydraulic pressurization system 24. In other embodiments, the regulator 58 may be used in conjunction with the bypass valve 36 to control pressure in the hydraulic circuit 52.

As further shown in FIG. 3, the hydraulic circuit 52 also includes a plurality of solenoid valves 61, 62, 63, 64, 65, 66, 67, and 68, a plurality of clutches 71, 72, 73, 74, and 75, and a plurality of valves 81, 82, 83, 84, 85, 86, 87, 88, 89, 90. Those components of the hydraulic circuit 52 are arranged and configured to provide a number of reverse, neutral, and forward drive transmission ranges as is known in the art.

In the illustrative embodiment, the valves 83, 84, 85 of the hydraulic circuit 52 are embodied as logic valves that include switches 91, 94, 95 (respectively) situated in pressure bulbs associated with valves 83, 84, 85 as shown in FIG. 3. The switches 91, 94, 95 are configured to detect whether the pressure supplied to the valves 83, 84, 85 is at, or above, a hold threshold pressure. The hydraulic circuit 52 can include other pressure switches 92, 93 as shown in FIG. 3. In the illustrative embodiment, the switches 91, 92, 94, 95 are electrically coupled to the controller 50, and the controller 50 receives a signal from the switches 91, 94, 95 indicating if the valves 83, 84, 85 are being supplied with the hold threshold pressure (for example, about 25-30 psi). The controller 50 may be configured to turn on the drive unit 30 if the controller 50 determines that the auxiliary hydraulic pressurization system 24 fails to provide at least the hold threshold pressure to the pressure switches 92, 94 of the hydraulic circuit 52 while the drive unit 30 is off and the vehicle 10 is at a stop.

Figure 4:
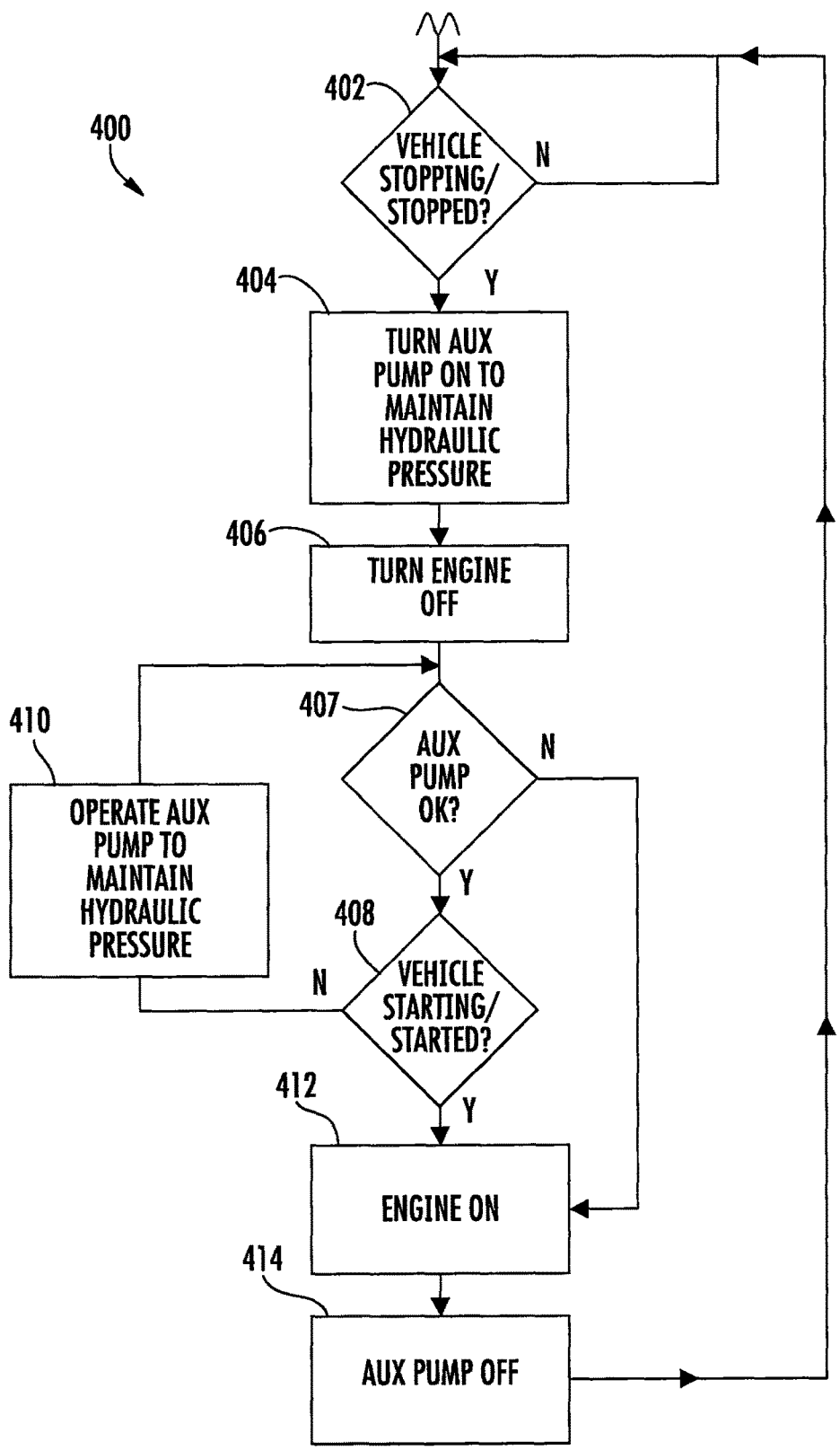
FIG. 4 is a simplified block diagram showing a method of operating the vehicle of FIG. 2.

Referring now to FIG. 4, in use, the controller 50 may execute a method 400 for operating the vehicle 10 to maintain the hydraulic pressure of the hydraulic control system 48 when the drive unit 30 of the vehicle 10 is in an off state (turned off). The method 400 may be embodied as, for example, a set of instructions stored in the memory 51 and executed by the controller 50. The method 400 begins with block 402 in which the controller 50 determines whether the vehicle 10 is in a stop condition (i.e., whether the vehicle 10 is stopped or in the process of stopping). To do so, in some embodiments, the controller 50 may receive a signal from a sensor 96 included in the ECM 31. In the illustrative embodiment, the signal from the sensor 96 is indicative of the velocity of the vehicle 10 based on drive unit 10 output RPM. The detected velocity signal is usable by the controller 50 to determine whether the vehicle is in a stop condition or may be directly indicative that the vehicle is in a stop condition (e.g., the velocity signal may indicate that the velocity of the vehicle 10 has dropped below a stopping/stopped velocity threshold). In other embodiments, the controller 50 may receive signals from one or more other sensors to determine if the vehicle 10 is in a stop condition. For example, signals indicative of vehicle acceleration/deceleration from accelerometers, signals indicative of user inputs such as from brake pedals, or other suitable signals may be used to determine if the vehicle 10 is in a stop condition. If the controller 50 determines that the vehicle 10 is not in a stopping condition, the method 400 loops back to block 402 to continue to monitor for a stopping condition.

If the controller 50 determines that the vehicle 10 is in a stop condition, the method 400 proceeds to a block 404 in which the controller 50 turns on the auxiliary pump 34. That is, if the controller 50 determines that the vehicle has come to a stop or is in the process of stopping, the auxiliary pump 34 is turned on and establishes a hold pressure in the hydraulic circuit 52. In the event that the hydraulic circuit 52 is still pressurized by the main pump 56 or by residual pressure in the circuit 52, flow from the auxiliary pump 34 may be passed through the bypass valve 36 until pressure in the circuit 52 drops below the threshold bypass pressure required to close the bypass valve 36. Additionally, should the controller 50 receive a signal from the pressure sensor 40 indicating that pressure in the high pressure line 37 is greater than a high sensor threshold, the controller 50 may be configured to turn off the auxiliary pump 34 until the signal from the pressure sensor 40 indicates that the pressure in the high pressure line 37 is below the high sensor threshold (and that the vehicle 10 is still in the stop condition).

After the auxiliary pump 34 has been turned on in block 404, the method 400 advances to block 406 in which the controller 50 causes the drive unit 30 (illustratively an engine) to be turned off. To do so, for example, the controller 50 may send a request signal to request that the ECM 31 turn off the drive unit 30. In some embodiments, the controller 50 may request a dwell time before the drive unit 30 is turned off. The dwell time may be configured to allow the auxiliary pump 34 to develop the hold threshold pressure. In some embodiments, the controller 50 may operate the hydraulic circuit 52 during the dwell time before drive unit 30 is turned off so that one or more clutches are engaged to resist roll back. For example clutch 75 may be engaged during the dwell time so that the transmission 22 resists roll back in a manner similar to that described in U.S. Pat. No. 4,070,927, which is hereby incorporated by reference in its entirety, except in parts that contradict the present disclosure. In other embodiments, the controller 50 may operate the hydraulic circuit 52 to engage such clutches, or other clutches, after the drive unit 30 is turned off.

It should be appreciated that while the drive unit 30 is off, the main pump 56 mechanically driven by the drive unit 30 is also turned off and, as such, does not provide pressure to the hydraulic circuit 52. However, the auxiliary hydraulic pressurization system 24, via the auxiliary pump 34, maintains pressure in the hydraulic circuit 52 while the main pump 56 is off such that engagement of the transmission 22 between the drive unit 30 and the vehicle load 32 is maintained even when the drive unit 30 is turned off. It should be appreciated that without use of the auxiliary hydraulic pressurization system 24, hydraulic pressure in the hydraulic circuit 52 may drop in response to the main pump 56 being turned off due to systemic bleeds and leaks within the hydraulic circuit 52 culminating in disengagement of the drive unit 30 from the vehicle load 32.

After the drive unit has been turned off in block 406, the method 400 advances to block 407 in which the controller 50 determines whether the auxiliary hydraulic pressurization system 24 is operating properly. To do so, the controller 50 may determine whether the hydraulic pressurization system 24 is providing at least the hold threshold pressure to the hydraulic circuit 52. For example, in the illustrative embodiment, the controller 50 monitors signals received from the switches 92, 94 included in the logic valve 84 to determine whether the hold threshold pressure is being supplied to the valve 84. In other embodiments, the controller 50 may determine the status of the auxiliary hydraulic pressurization system 24 based on other suitable signals. If the controller 50 determines that the auxiliary hydraulic pressurization system 24 is operating properly, the method 400 advances to block 408 in which a check is performed to determine whether the vehicle 10 is starting. If the controller 50 determines that the auxiliary hydraulic pressurization system 24 is not operating properly (e.g. the pressure supplied to the valve 84 of the hydraulic circuit is below the hold threshold pressure), the method 400 advances to block 412 to restart the drive unit 30 and thereby restore operation of the main pump 56 to pressurize the hydraulic circuit 52.

When the drive unit 30 is turned off and the vehicle 10 is at a stop in block 406, and the auxiliary hydraulic pressurization system 24 is determined to be operating properly in block 407, the method 400 proceeds to block 408 in which the controller 50 determines whether the vehicle 10 is starting or has started. To do so, the controller 50 may monitor one or more sensor signals indicative of a starting condition of the vehicle 10. For example, in the illustrative embodiment, the controller 50 receives a sensor signal from an accelerator sensor 98 included in the ECM 31, which indicates that the accelerator pedal has been being pressed by a user (providing a user request for movement). In other embodiments, the controller 50 may determine that the vehicle is starting or started as a function of brake signal received from the ECM 31, which indicates that a brake pedal has been released. Of course, the controller 50 may make such determination based on received signals such as signals indicative of changing velocity/acceleration or other suitable signals. If the controller 50 determines that the vehicle 10 is not starting or started, the method 400 advances to block 410 in which controller 50 continues to operate the auxiliary pump 34 to maintain pressure in the hydraulic circuit 52.

While maintaining pressure in the hydraulic circuit 52 in the block 410, the controller 50 may monitor the pressure in the high pressure line 37 and take appropriate action based thereon. For example, the illustrative controller 50 is configured to turn off the auxiliary pump 34 in response to a pressure signal from the sensor 40 indicating that the pressure in the high pressure line 37 has exceeded the high sensor threshold. In some embodiments, the controller 50 may also turn off the auxiliary pump 34 in response to a pressure signal from the sensor indicating that the pressure in the high pressure line 37 is below a low sensor threshold. In other embodiments, the controller 50 may be configured to toggle the auxiliary pump 34 on and off to maintain an engagement pressure in the hydraulic circuit 52 while minimizing the use of energy from the energy storage unit 45 while the vehicle 10 stopped.

Referring back to blocks 407 and 408, if the controller 50 determines that (i) the auxiliary hydraulic pressurization system 24 is not operating properly or (ii) the vehicle 10 is starting or started, the method 400 advances to block 412 in which the controller 50 causes the drive unit 30 (e.g., engine) to be returned to an on state (turned on). To do so, for example, the controller 50 may send a signal to the ECM 31 requesting that the drive unit 30 be turned on. When the drive unit 30 is turned back on, the main pump 56 is again mechanically driven to establish a run pressure in the hydraulic circuit 52. The run pressure produced by the main pump 56 is typically greater than the hold pressure produced by the auxiliary pump 34. However, in some embodiments, the run pressure may be equal to, or less than, the hold pressure.

After the drive unit 10 has been turned on in block 412, the method 400 advances to block 414 in which the controller 50 turns off the auxiliary pump 34 to reset the auxiliary hydraulic pressurization system 24 for future stops of the vehicle 10 and to allow energy storage unit 45 to be recharged. In some embodiments, the controller 50 waits for expiration of a dwell time before turning off the auxiliary pump 34 to allow the main pump 56 to develop normal operating pressures after the drive unit 30 is turned back on. Once the auxiliary pump 34 is off, the method 400 loops back to block 402 in which the controller 50 again determines whether the vehicle 10 is in a stop condition (i.e., is stopping or stopped).

In some embodiments, the controller 50 may be further configured to determine whether the energy storage unit 45 has a sufficient charge to operate the auxiliary pump 34 while the drive unit 30 is shut down during a stop. For example, a sensor (not shown) can be adapted to detect and monitor a charge status of the energy storage unit 45. The sensor (not shown) can be disposed in electrical communication (e.g., over a communication link or bus) with the controller 50. The controller 50 can evaluate the charge status of the energy storage unit 45 in view of a charge threshold. If the controller 50 determines that the energy storage unit 45 is not sufficiently charged (e.g., the charge status is below the charge threshold), the controller 50 may operate the solenoid 68 and various other components of the transmission unit 20 to reduce the engine load required to maintain the condition of the transmission unit 20 during the stop with the drive unit 30 still on as described, for example, in U.S. Pat. No. 7,338,407 REDUCED ENGINE LOAD AT STOP APPARATUS AND METHOD to Long et al. U.S.

Pat. No. 7,338,407, which is hereby incorporated by reference, in its entirety, except in parts that contradict the present disclosure.

Figure 5:
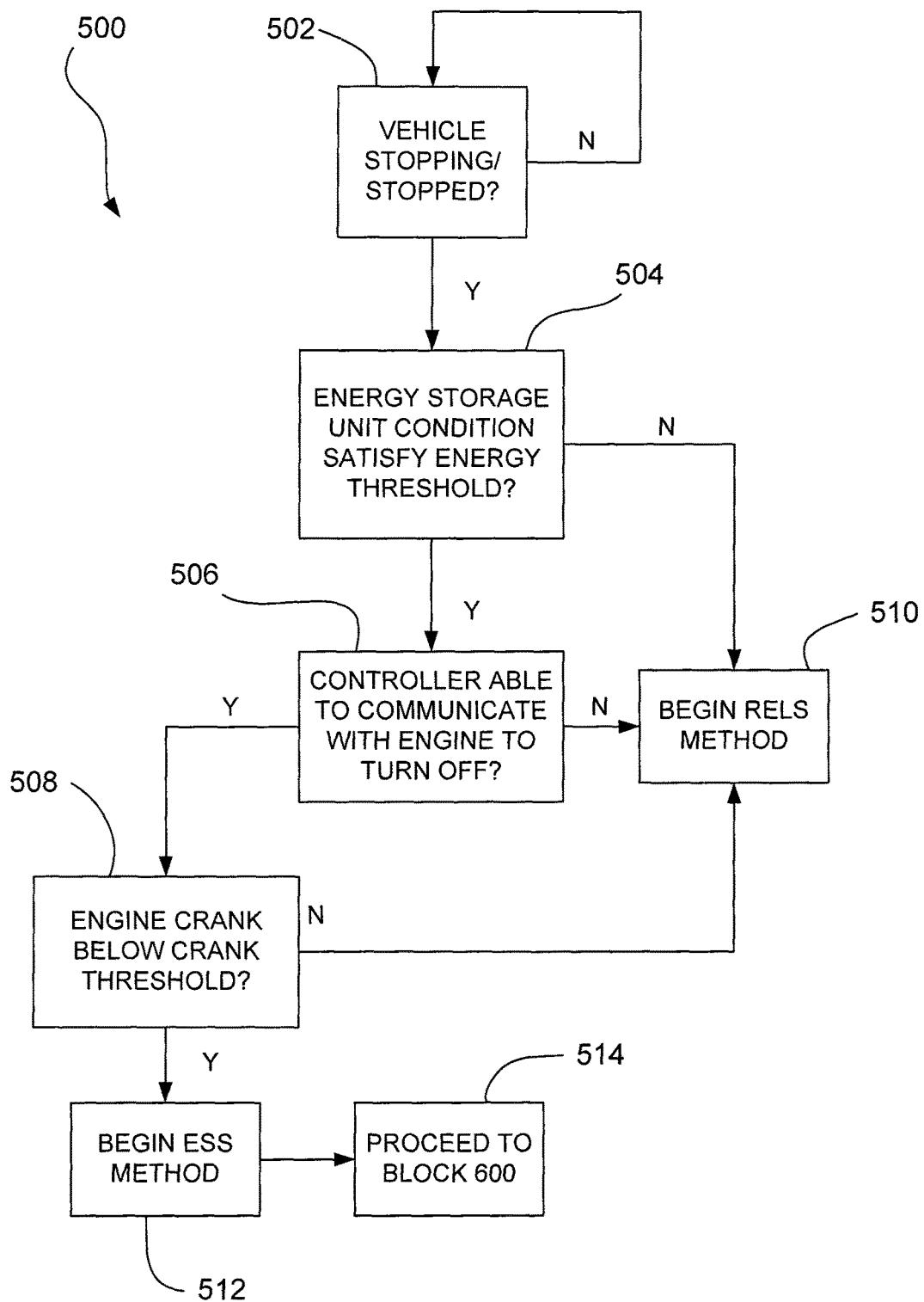
FIG. 5 is a simplified block diagram showing an alternative method of operating the vehicle of FIG. 2.

Referring to FIG. 5, the controller 50 may be programmed to execute a different method 500 for operating the vehicle 10 to maintain the hydraulic pressure of the hydraulic control system 48 when the drive unit 30 of the vehicle is in an off state. Similar to method 400, the method 500 may be embodied as a set of instructions stored in the memory 51 and executed by the controller 50. Here, the method 500 begins with block 502 in which the controller 50 determines whether the vehicle 10 is in a stop condition, or alternatively, in the process of stopping. As previously described, the controller 50 may receive a signal from the sensor 96 included in the ECM 31. In the illustrative embodiment, the signal from the sensor 96 can be indicative of the velocity of the vehicle 10 based on drive unit 10 output RPM. The detected velocity signal is usable by the controller 50 to determine whether the vehicle is in a stop condition or may be directly indicative that the vehicle is in a stop condition (e.g., the velocity signal may indicate that the velocity of the vehicle 10 has dropped below a stopping/stopped velocity threshold). In other embodiments, the controller 50 may receive signals from one or more other sensors to determine if the vehicle 10 is in a stop condition. For example, signals indicative of vehicle acceleration/deceleration from accelerometers, signals indicative of user inputs such as from brake pedals, or other suitable signals may be used to determine if the vehicle 10 is in a stop condition. If the controller 50 determines that the vehicle 10 is not in a stopping condition, the method 500 remains in block 502 to continue to monitor for a stopping condition.

Once the controller 50 determines that the vehicle 10 is either in the stopped condition or is in the process of stopping, the method 500 can proceed to block 504 in which the controller 50 determines whether the energy storage unit 45 has a current charge status that satisfies a charge threshold. As previously described, a sensor (not shown) disposed on or near the energy storage unit 45 can measure the voltage and/or amperage across the energy storage unit 45 and communicate this measurement to the controller 50. In any event, the controller 50 can determine in block 504 whether the energy storage unit 45 has sufficient charge to operate the auxiliary pump 34 while the drive unit 30 is shut down during a stop. In addition, the threshold condition can be established and stored in the memory 51 of the controller 50 to ensure that the energy storage unit 45 has sufficient charge to restart the drive unit 30 once it is shutdown.

If, in block 504, the controller 50 determines that the energy storage unit 45 has sufficient charge and satisfies the threshold condition, the method 500 proceeds to block 506 in which the controller 50 determines whether the drive unit 30 (illustratively an engine) can be commanded to turn off. For instance, the controller 50 can determine whether it is capable of communicating over a communication link to the ECM 31 to turn the engine off Alternatively, a communication link established by the Society of Automobile Engineers (SAE) may allow the controller 50 to communicate with the ECM 31 over a standard communication link, such as J-1939 for example. In another aspect, a hard-wired connection may form a communication path between the controller 50 and a relay on a starter on the vehicle 10 to crank the drive unit 30. In a further aspect, the controller 50 may be able to communicate directly or indirectly with the ECM 31, send a request message to the ECM 31 to crank or turn off, and then allow the ECM 31 to make a determination whether or when to do so. In any event, in block 506, the controller 50 is configured to determine whether it is capable of turning off the drive unit 30.

If the controller 50 determines in block 506 that it can turn off the drive unit 30, or at least send a request message to the ECM 31 to turn off the drive unit 30, the method 500 proceeds to block 508 in which a determination is made whether the drive unit 30 (illustratively an engine) cranks at a drive unit 30 output RPM that is below a crank threshold or limit. The drive unit 30 output RPM at which the drive unit 30 cranks may be a range or a single value that can be stored in the memory 51 of the controller. Alternatively, the ECM 31 can communicate this to the controller 50 according to known methods.

If the determination made in block 508 is that the drive unit 30 output RPM during crank is less than the crank threshold or limit, the method 500 proceeds to block 512 in which the controller 50 is triggered to enable an engine start-stop control process. In this manner, the aforementioned blocks can form a pre-enablement or activation process before the controller 50 moves forward with operating the vehicle 10 to maintain the hydraulic pressure of the hydraulic control system 48 when the drive unit 30 of the vehicle is in an off state. In other words, the controller 50 can perform various calculations and determinations in order to ensure that the vehicle 10 is in a desired condition before the engine start-stop control process is enabled. For purposes of this disclosure, the engine start-stop control process can refer to the method 400, the method 500, or some combination thereof.

In the event the controller 50 determines that the energy storage unit 45 does not have sufficient charge in block 504, the method 500 can proceed to block 510 in which the controller 50 may operate the solenoid 68 and various other components of the transmission unit 20 to reduce the engine load required to maintain the condition of the transmission unit 20 during the stop with the drive unit 30 still on. Moreover, if the controller 50 determines in block 506 that the controller 50 is unable to communicate with the drive unit 30 or ECM 31 to turn the drive unit 30 off, the method 500 proceeds to block 510. In yet another instance, if the drive unit 30 output speed during crank exceeds the crank threshold or limit in block 508, the method 500 proceeds to block 510. This will be further described with reference to FIG. 8.

Once the engine start-stop control process is enabled in block 512, the method 500 proceeds to block 514 and block 600 in which the controller 50 communicates with the hydraulic control circuit 52 to initiate a clutch fill for an oncoming clutch. As will be explained with reference to FIG. 7, the oncoming clutch can be a normally disengaged clutch but which is at least partially filled to lock the output of the transmission 22. The locked output can reduce or prevent the vehicle 10 from moving in reverse if stopped on an incline, for example. The control of the oncoming clutch in block 600 can occur at any time during the method 500, and the timing of such is further described with reference to FIG. 7. The manner in which the oncoming clutch is filled can be achieved to known methods.

Once the controller 50 determines that the vehicle is in a stop condition and that the engine start-stop control process is enabled, the method 500 advances to block 602 in which a reduced hydraulic pressure from the main pump 56 pressurizes the hydraulic control system 48. This reduced hydraulic pressure can be triggered by the solenoid valve 66 which is in fluid communication with the main pressure regulator 58 in the hydraulic control circuit 52 for controllably reducing or modulating the hydraulic pressure.

Once the reduced hydraulic pressure is achieved in block 602, method 500 advances to block 604 in which a certain waiting period or dwell time can be triggered to allow the hydraulic pressure in the hydraulic control system 48 to regulate to a desired pressure. This delay can be controlled by a timing mechanism in the controller 50, and the controller 50 can be structured to initiate, terminate, or extend the delay as necessary. In other words, the controller 50 can be in communication with the hydraulic circuit 52 to determine when the hydraulic pressure is regulated. This regulation pressure can be defined as a range of pressures or at a limit or threshold pressure. In any event, the controller 50 can compare the hydraulic pressure to the range or threshold pressure before allowing the method 500 to continue.

As the hydraulic pressure regulates in block 604, method 500 advances to block 606 in which the controller 50 turns on the auxiliary pump 34. As described above, the auxiliary pump 34 is turned on and establishes a hold pressure in the hydraulic circuit 52. In the event that the hydraulic circuit 52 is still pressurized by the main pump 56 or by residual pressure in the circuit 52, flow from the auxiliary pump 34 may be passed through the bypass valve 36 until pressure in the circuit 52 drops below the threshold bypass pressure required to close the bypass valve 36. Additionally, should the controller 50 receive a signal from the pressure sensor 40 indicating that pressure in the high pressure line 37 is greater than a high sensor threshold, the controller 50 may be configured to turn off the auxiliary pump 34 until the signal from the pressure sensor 40 indicates that the pressure in the high pressure line 37 is below the high sensor threshold (and that the vehicle 10 is still in the stop condition).

The reduced or trimmed hydraulic pressure set forth in block 602 can allow the auxiliary pump 34 to operate at a lower energy level since it is pumping flow into a reduced pressure system. Moreover, the auxiliary pump 34 is able to continuously pump sufficient flow to allow the transmission 22 to maintain enough clutch pressure on one or more of its clutches to enable the transmission to remain in a low range (i.e., high gear ratio) or low speed ratio even when the drive unit 30 is turned off. Thus, the transmission 22 can quickly respond, if necessary, to an operator command to start moving in a forward direction.

In block 608, the hydraulic control circuit 52 continuously commands full clutch pressure for each of the filled, or partially filled, clutches. This is the case after block 602 in which the reduced hydraulic pressure is established and in block 604 in which the auxiliary pump 34 is turned on.

As the hydraulic control circuit 52 continuously commands full clutch pressure in block 608, the method 500 advances to block 610 in which the controller 50 causes the drive unit 30 (illustratively an engine) to be turned off. In block 506 the controller determined whether it could controllably disable or turn off the drive unit 30 such that at block 610 the controller 50 turns off the drive unit 30. Again, in one embodiment, the controller 50 may send a request signal to request that the ECM 31 turn off the drive unit 30.

With the drive unit 30 turned off, the main pump 56 is also turned off and, as such, does not provide pressure to the hydraulic circuit 52. However, the auxiliary hydraulic pressurization system 24, via the auxiliary pump 34, maintains pressure in the hydraulic circuit 52 while the main pump 56 is off such that engagement of the transmission 22 between the drive unit 30 and the vehicle load 32 is maintained even when the drive unit 30 is turned off.

After the drive unit has been turned off in block 610, the method 500 advances to block 612 in which the controller 50 determines whether the auxiliary hydraulic pressurization system 24 is operating properly. To do so, the controller 50 may determine whether the hydraulic pressurization system 24 is providing at least the hold threshold pressure to the hydraulic circuit 52. For example, in the illustrative embodiment, the controller 50 monitors signals received from the switches 92, 94 included in the logic valve 84 to determine whether the hold threshold pressure is being supplied to the valve 84. In other embodiments, the controller 50 may determine the status of the auxiliary hydraulic pressurization system 24 based on other suitable signals. If the controller 50 determines that the auxiliary hydraulic pressurization system 24 is operating properly, the method 500 advances to block 614 in which a check is performed to determine whether the vehicle 10 is starting. If the controller 50 determines that the auxiliary hydraulic pressurization system 24 is not operating properly (e.g. the pressure supplied to the valve 84 of the hydraulic circuit is below the hold threshold pressure), the method 500 advances to block 616 to restart the drive unit 30 and thereby restore operation of the main pump 56 to pressurize the hydraulic circuit 52.

When the drive unit 30 is turned off and the vehicle 10 is at a stop in block 610, and the auxiliary hydraulic pressurization system 24 is determined to be operating properly in block 612, the method 500 proceeds to block 614 in which the controller 50 determines whether the vehicle 10 is starting or has started. To do so, the controller 50 may monitor one or more sensor signals indicative of a starting condition of the vehicle 10. For example, in the illustrative embodiment, the controller 50 receives a sensor signal from an accelerator sensor 98 included in the ECM 31, which indicates that the accelerator pedal has been being pressed by a user (providing a user request for movement). In other embodiments, the controller 50 may determine that the vehicle is starting or started as a function of brake signal received from the ECM 31, which indicates that a brake pedal has been released. Of course, the controller 50 may make such determination based on received signals such as signals indicative of changing velocity/acceleration or other suitable signals. If the controller 50 determines that the vehicle 10 is not starting or started, the method 500 advances to block 618 in which controller 50 continues to operate the auxiliary pump 34 to maintain pressure in the hydraulic circuit 52.

While maintaining pressure in the hydraulic circuit 52 in the block 618, the controller 50 may monitor the pressure in the high pressure line 37 and take appropriate action based thereon. For example, the illustrative controller 50 is configured to turn off the auxiliary pump 34 in response to a pressure signal from the sensor 40 indicating that the pressure in the high pressure line 37 has exceeded the high sensor threshold. In some embodiments, the controller 50 may also turn off the auxiliary pump 34 in response to a pressure signal from the sensor indicating that the pressure in the high pressure line 37 is below a low sensor threshold. In other embodiments, the controller 50 may be configured to toggle the auxiliary pump 34 on and off to maintain an engagement pressure in the hydraulic circuit 52 while minimizing the use of energy from the energy storage unit 45 while the vehicle 10 stopped.

Referring back to blocks 612 and 614, if the controller 50 determines that (i) the auxiliary hydraulic pressurization system 24 is not operating properly or (ii) the vehicle 10 is starting or started, the method 500 advances to block 616 in which the controller 50 causes the drive unit 30 (e.g., engine) to be returned to an on state (turned on). To do so, for example, the controller 50 may send a signal to the ECM 31 requesting that the drive unit 30 be turned on. When the drive unit 30 is turned back on, the main pump 56 is again mechanically driven to establish a run pressure in the hydraulic circuit 52. The run pressure produced by the main pump 56 is typically greater than the hold pressure produced by the auxiliary pump 34. However, in some embodiments, the run pressure may be equal to, or less than, the hold pressure.

After the drive unit 10 has been turned on in block 616, the method 500 advances to block 620 in which the controller 50 turns off the auxiliary pump 34 to reset the auxiliary hydraulic pressurization system 24 for future stops of the vehicle 10 and to allow energy storage unit 45 to be recharged. In some embodiments, the controller 50 waits for expiration of a dwell time before turning off the auxiliary pump 34 to allow the main pump 56 to develop normal operating pressures after the drive unit 30 is turned back on. Once the auxiliary pump 34 is off, the method 500 loops back to block 502 in which the controller 50 again determines whether the vehicle 10 is in a stop condition (i.e., is stopping or stopped).

Figure 6:
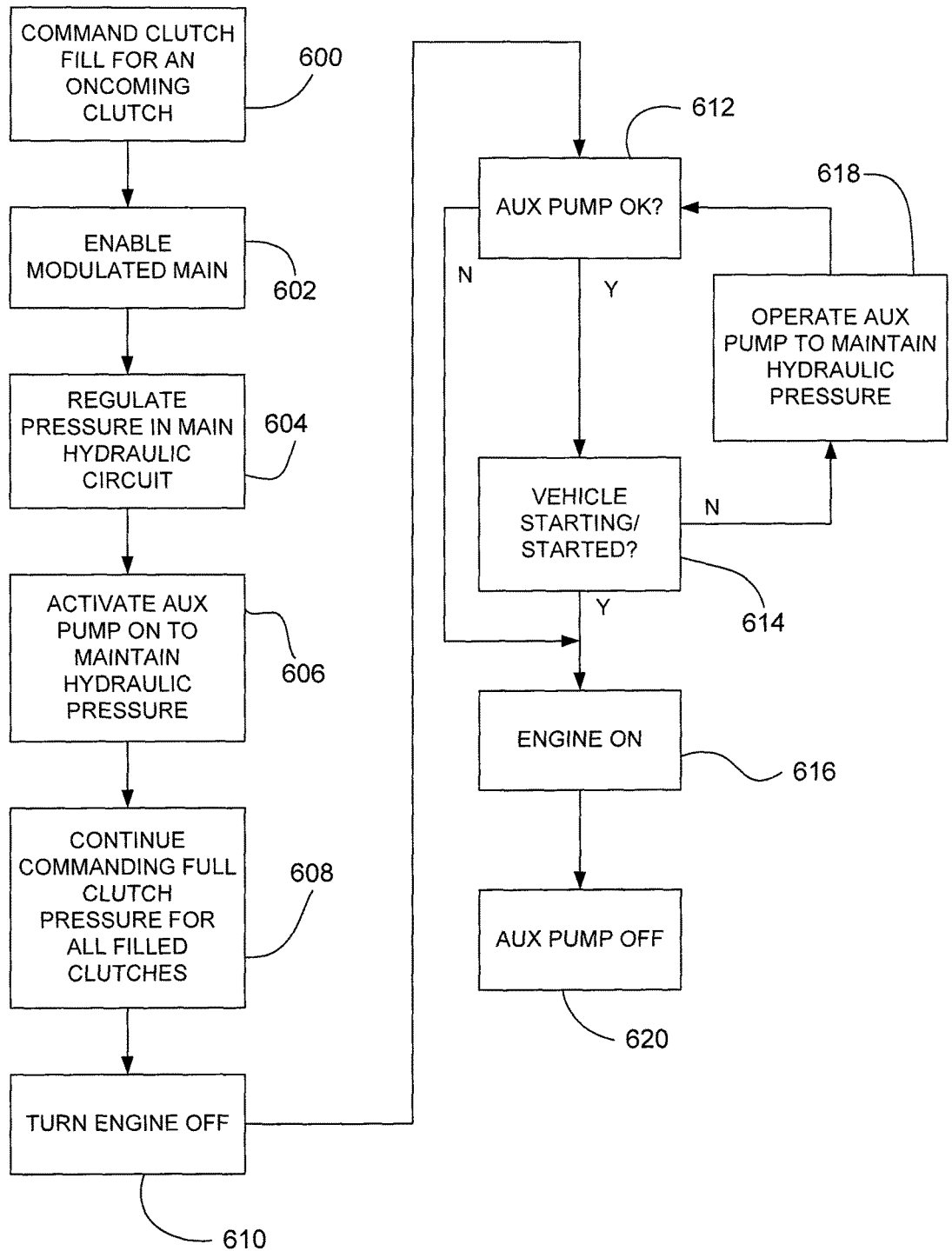
FIG. 6 is a simplified block diagram showing additional blocks of the alternative method of FIG. 5.

The blocks of FIGS. 5 and 6 are not intended to be arranged in any particular or desired sequential order. Instead, the blocks are only represented in FIGS. 5 and 6 as considerations and determinations that one of many different methods may undertake for operating the vehicle 10 to maintain the hydraulic pressure of the hydraulic control system 48 when the drive unit 30 of the vehicle is in an off state. Thus, in one embodiment, one or more of the blocks in FIGS. 5 and 6 may be skipped. In a different embodiment, two or more of the blocks may be performed in reverse order. In other words, the blocks of FIGS. 5 and 6 are not sequentially ordered, but rather are only provided as an illustrative embodiment of one of many methods 500.

Figure 7:
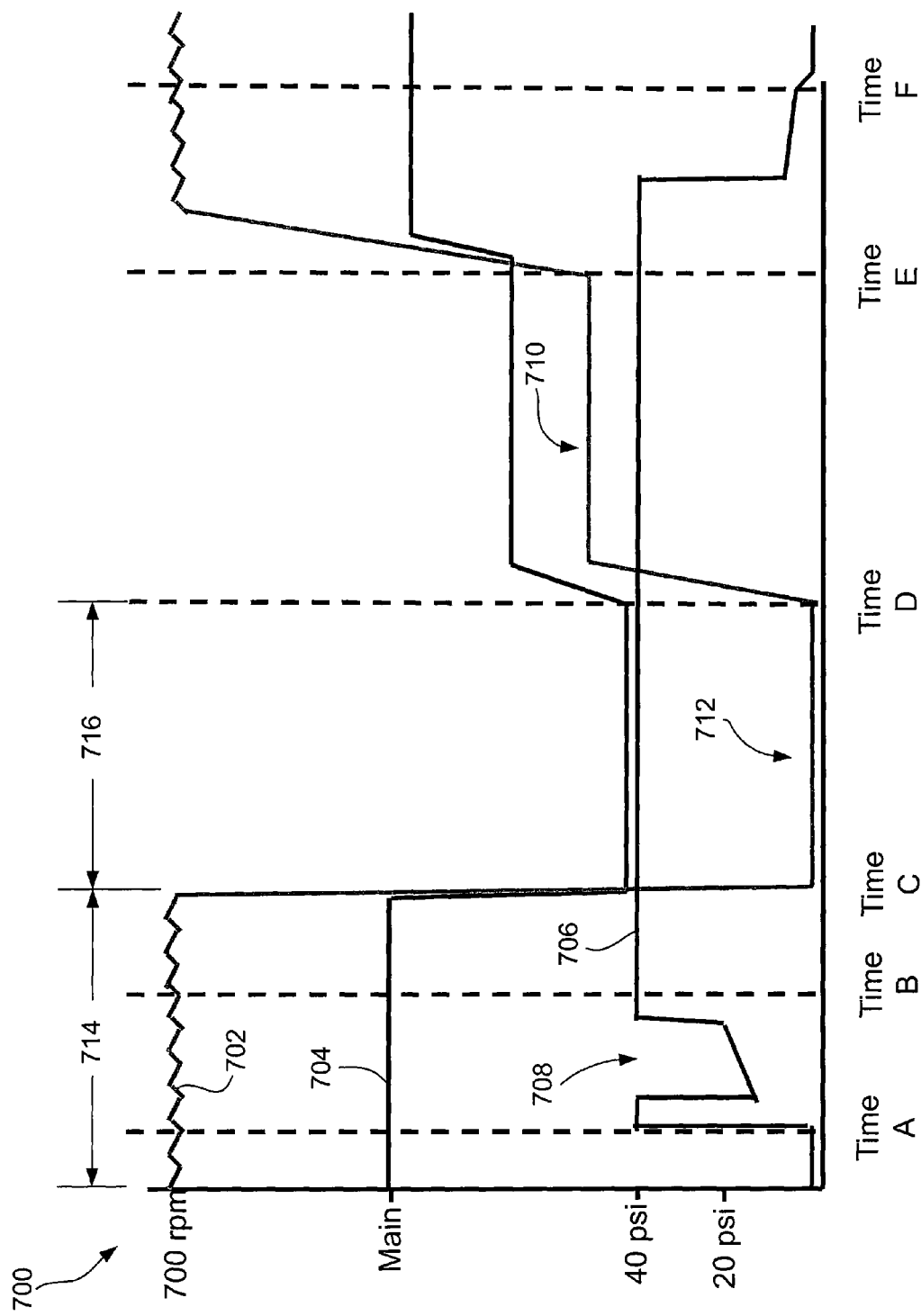
FIG. 7 is a time-based diagram of a method of operating the vehicle of FIG. 2.
Figure 8:
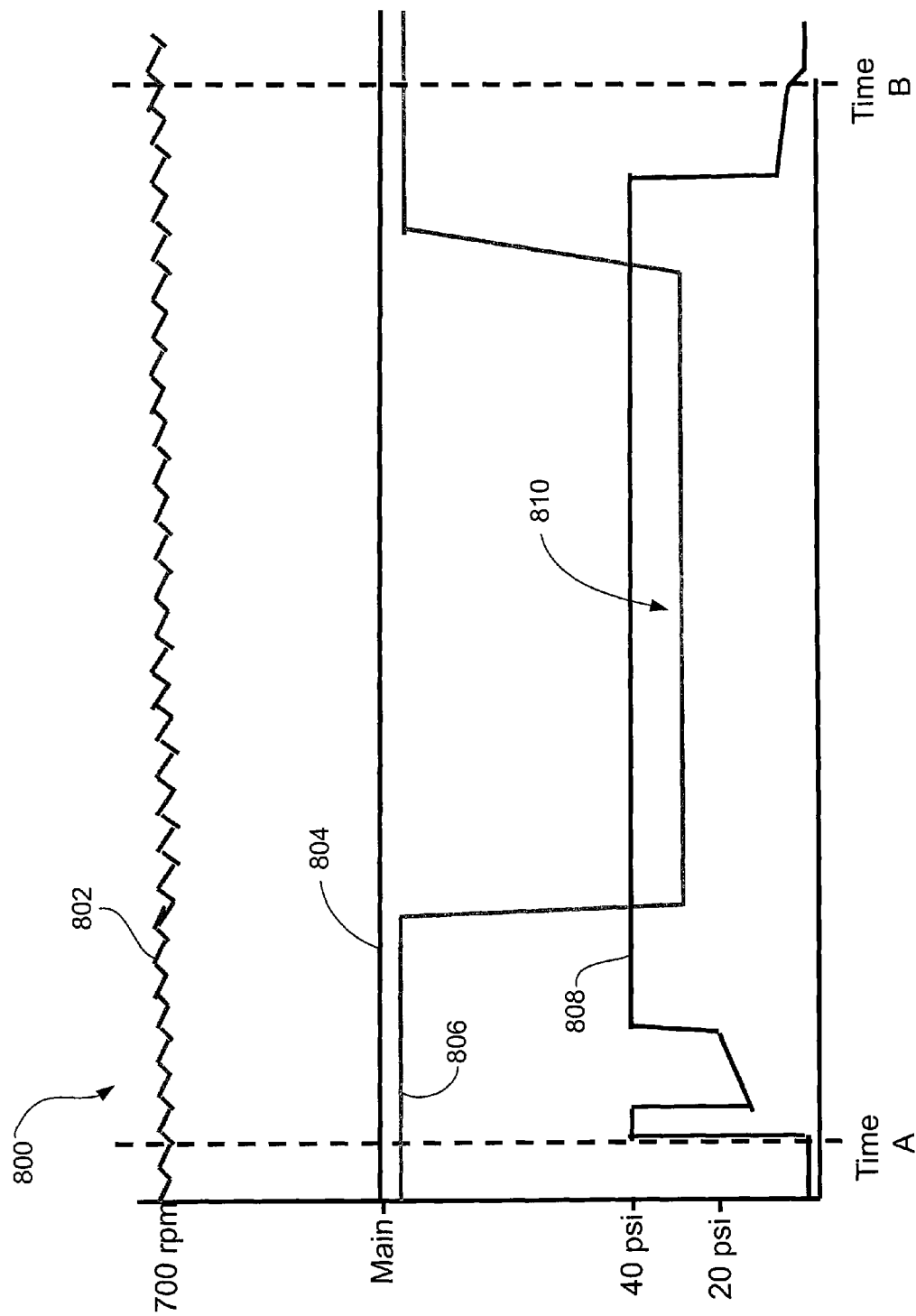
FIG. 8 is another time-based diagram of a method of operating the vehicle of FIG. 2.

Referring now to FIG. 7, an graphical representation 700 illustrates the manner in which the controller 50 may execute methods 400, 500 for operating the vehicle 10 to maintain the hydraulic pressure of the hydraulic control system 48 when the drive unit 30 of the vehicle 10 is in an off state (turned off). In FIG. 7, several transitions (e.g., Time A, Time B, Time C, etc.) are shown representing instances in time when a determination is made or an action taken by the transmission 22 or drive unit 30, and in particular, the controller 50 or ECM 31. It is to be understood that FIG. 7 and FIG. 8 are only examples of how methods 400, 500 may be carried out and are not intended to be limiting.

In FIG. 7, a first curve 702 is shown representing the drive unit 30 output RPM (i.e., engine speed when the drive unit is an engine). In FIG. 7, before Time A, the drive unit 30 output RPM is shown at or near an idle condition. The drive unit 30 output RPM of 700 RPM is only an example, and it is to be understood that other drive units may idle at different speeds.

A second curve 704 is shown representing the hydraulic pressure in the main or hydraulic control circuit 52. Prior to Time A, the internal or main pump 56 is producing the hydraulic pressure in the control circuit 52 at the level shown in FIG. 7. For purposes of this example only, the hydraulic pressure 704 in the control circuit 52 is also representative of the clutch pressure of two of a plurality of clutches configured in an applied state. For example, the hydraulic pressure 704 can be representative of the clutch pressure in a first clutch 71 and a second clutch 75.

A third curve 706 is shown representing a hydraulic pressure of a third clutch 74. This third clutch 74 can be referred to as the oncoming clutch as described with reference to block 600. As the third clutch 74 is at least partially applied, vehicle 10 rollback can be resisted or prevented.

Referring now to FIGS. 5-7, method 500 begins with block 502. Here, the controller 50 determines whether the vehicle is stopped or in the process of stopping. In FIG. 7, the controller 50 can receive the drive unit 30 output RPM over a communication link or the like from the ECM 31. Prior to Time A, the drive unit 30 is shown at or near an idle condition. The controller 50 can interpret this condition by comparing the drive unit 30 output RPM to a speed threshold and infer that either the vehicle is stopped or in the process of stopping. The drive unit 30 output RPM can be used to calculate vehicle acceleration according to known methods, and based on a negative vehicle acceleration the controller 50 may further infer that the vehicle is in the process of stopping. Thus, in this example, the controller 50 determines that the vehicle 10 is either stopped or in the process of stopping.

In blocks 504 and 506, the controller 50 makes determinations whether the energy storage unit 45 has sufficient charge (i.e., block 504) and whether the controller 50 can communicate with the ECM 31 or drive unit 30 to disable or turn off the drive unit 30. For purposes of this example, it is assumed that the energy storage unit 45 does have sufficient charge and the controller 50 is able to communicate with the ECM 31 or drive unit 30 to disable the drive unit 30. In the event either condition set forth in blocks 504 and 506 were untrue, then the method 500 would advance to block 510 which will be explained in further detail with reference to FIG. 8.

In block 508 of the method 500, the controller 50 determines whether the drive unit 30 output RPM is below a crank threshold during engine crank (the drive unit 30 is illustratively shown as an engine). Under normal conditions, a conventional transmission is in neutral (i.e., no transmission output) during an engine crank. In method 500, however, the engine or drive unit 30 is disabled or turned off but with at least two clutches 71, 75 of the transmission 22 filled with hydraulic pressure. During crank, there is usually very little, if any load, applied against the torque converter (not shown) of the transmission 22 since there is very little, if any, hydraulic pressure built up in the converter. Therefore, as long as the drive unit 30 output RPM cranks at a lower speed, there will be little, if any, load acting against the drive unit 30 or its starter. The hydraulic pressure in both clutches 71, 75 can be maintained at desired levels without having to reduce such pressures and induce possible clutch slippage. As a result, if the condition set forth in block 508 is satisfied, the drive unit 30 can crank under normal conditions without inducing any load on its starter.

If the condition in block 408 is satisfied, the method 500 advances to block 512 and enables the engine start-stop control process. In doing so, method 500 proceeds to blocks 514 and 600 in which the controller 50 sends a request to the hydraulic control circuit 52 to bring on the third clutch 74. In FIG. 7, block 600 is illustrated at Time A where the hydraulic pressure 706 builds as the third clutch 74 is at least partially filled. As shown, a time period between Time A and Time B represents the fill time 708 of the oncoming, third clutch 74. The hydraulic pressure 706 comes from the main pump 56, and once filled, the hydraulic pressure 704 of the third clutch is less than the hydraulic pressure 704 of the first clutch 71 and second clutch 75. Here, the hydraulic pressure 706 of the third clutch 74 is sufficient to resist vehicle 10 rollback. At Time B, the third, oncoming clutch 74 is filled to a desired hydraulic pressure 706.

Although not shown as a specific time period in FIG. 7, the method 500 advances to blocks 602, 604, 606, and 608 before disabling the drive unit 30. In block 602, after the controller 50 has determined that the vehicle 10 is in a stop condition, the auxiliary pump 34 is enabled to maintain or establish a hold pressure in the control circuit 52. In the event that the hydraulic circuit 52 is still pressurized by the main pump 56 or by residual pressure in the circuit 52, flow from the auxiliary pump 34 may be passed through the bypass valve 36 until pressure in the circuit 52 drops below the threshold bypass pressure required to close the bypass valve 36. Additionally, should the controller 50 receive a signal from the pressure sensor 40 indicating that pressure in the high pressure line 37 is greater than a high sensor threshold, the controller 50 may be configured to turn off the auxiliary pump 34 until the signal from the pressure sensor 40 indicates that the pressure in the high pressure line 37 is below the high sensor threshold (and that the vehicle 10 is still in the stop condition).

In block 604, controller 50 continues to request full clutch pressure from all of the filled clutches. This will be further explained after Time C. Referring to block 606, the controller 50 can activate or enable the solenoid valve 66 to trigger a boost system of the control circuit 52. The boost system can adjust or trim clutch pressures within the control circuit 52 under idle conditions. The boost system can also assist with the performance of the auxiliary pump 34. In some embodiments, the auxiliary pump 34 may not be sized to hold full engine or drive unit torque. It may also be undesirable to draw a significant amount of current from the energy storage unit 45. Therefore, the auxiliary pump 34 can be integrated into the hydraulic control system 48 of the transmission 22 by providing fluid flow under lower hydraulic pressure conditions by activating the boost system. Again, to do so, the regulator 58 is designed to regulate hydraulic pressure in the control circuit at a certain pressure, and the boost system effectively decreases this regulation pressure by activating the solenoid valve 66.

At Time C in FIG. 7, the method 500 advances to block 610 in which the controller 50 communicates with the drive unit 30 or ECM 31 to disable or turn the drive unit 30 off. As shown, the drive unit 30 output RPM subsequently drops as the drive unit 30 is turned off. Since the main pump 56 is driven by the drive unit 30, the hydraulic pressure provided by the main pump 56 also drops. In FIG. 7, time period 714 represents the time in which the main pump 56 provides hydraulic pressure to the control circuit 52. As shown, once the main pump 56 is disabled, the auxiliary pump 34 continues to operate and provide sufficient hydraulic pressure 704 to maintain the first clutch 71 and second clutch 75 in applied states. The hydraulic pressure 704 of the first clutch 71 and second 75 is shown at Time C, and thereafter, as being less when the auxiliary pump 34 is active and the main pump 56 is disabled. Again, this is due to the solenoid valve 66 being triggered in block 606 to reduce the pressure in the control circuit 52 and the auxiliary pump 34 producing less flow in the circuit 52.

Between Time C and Time D (i.e., time period 716 in FIG. 7), the auxiliary pump 34 is operating and the method 500 continuously performs the condition set forth in block 604, i.e., continuing to command full clutch pressure for all filled clutches. As previously described, the methods 400, 500 can be executed operating the vehicle 10 to maintain the hydraulic pressure of the hydraulic control system 48 when the drive unit 30 of the vehicle 10 is in an off state (turned off). An input from a driver or operator of the vehicle 10, e.g., application of a vehicle brake pedal, can trigger the controller 50 to execute the methods 400, 500. Similarly, in block 614 of method 500, a related input may be triggered such that the controller 50 receivers a signal or infers that the driver or operator wants to start moving the vehicle 10 from the stop condition. For example, the controller 50 may receive a signal that the brake pedal has been released. The methods 400, 500 are designed to execute in such a manner that the drive unit 30 is restarted quickly and the transmission 22 is configured to operate the vehicle 10 as desired. As previously described, the transmission 22 can be configured to operate as desired by maintaining hydraulic pressure 704 in the first clutch 71 and second clutch 75 to enable the vehicle 10 to quickly move once the drive unit 30 has started.

As shown in FIG. 7, the hydraulic pressure 704 of both clutches 71, 75 is sufficient to enable the transmission 22 to react quickly to driver demand. This can be achieved by commanding full hydraulic pressure for both clutches in block 604. To command full pressure, the controller 50 can communicate with the hydraulic control circuit 52, and in particular the solenoid valves 61, 62, 63, 64, 65, 66, 67, and 68 and valves 81, 82, 83, 84, 85, 86, 87, 88, 89, 90. With the main pump 56 not operating, however, the hydraulic pressure is only being supplied by the auxiliary pump in spite of the command for full pressure in block 604. Therefore, the actual hydraulic pressure may be less than what is being commanded, and the boost system also reduces the hydraulic pressure in block 606 when the auxiliary pump is turned on. In the event the boost system fails or is disabled, e.g., the solenoid valve 66 is deactivated, the external motor 40 can have a thermal breaker that trips to protect the motor 40 with the auxiliary pump 34 running.

The method 500 can advance to blocks 612 and 614 once the drive unit 30 is turned off in block 610. This is illustrated in FIG. 7 at time period 712 (i.e., between Time C and Time D). Here, the controller 50 determines whether the auxiliary hydraulic pressurization system 24 is operating properly. To do so, the controller 50 may determine whether the hydraulic pressurization system 24 is providing at least the hold threshold pressure to the hydraulic circuit 52. For example, in the illustrative embodiment, the controller 50 monitors signals received from the switches 92, 94 included in the logic valve 84 to determine whether the hold threshold pressure is being supplied to the valve 84. In other embodiments, the controller 50 may determine the status of the auxiliary hydraulic pressurization system 24 based on other suitable signals. If the controller 50 determines that the auxiliary hydraulic pressurization system 24 is operating properly, the method 500 advances to block 608 in which a check is performed to determine whether the vehicle 10 is starting. If the controller 50 determines that the auxiliary hydraulic pressurization system 24 is not operating properly (e.g. the pressure supplied to the valve 84 of the hydraulic circuit is below the hold threshold pressure), the method 500 advances to block 612 to restart the drive unit 30 and thereby restore operation of the main pump 56 to pressurize the hydraulic circuit 52.

When the drive unit 30 is turned off and the vehicle 10 is at a stop in block 610, and the auxiliary hydraulic pressurization system 24 is determined to be operating properly in block 612, the method 500 proceeds to block 614 in which the controller 50 determines whether the vehicle 10 is starting or has started. To do so, the controller 50 may monitor one or more sensor signals indicative of a starting condition of the vehicle 10. For example, the controller 50 may receive a sensor signal from an accelerator sensor 98 included in the ECM 31, which indicates that the accelerator pedal has been being pressed by a user (providing a user request for movement). In other embodiments, the controller 50 may determine that the vehicle is starting or started as a function of brake signal received from the ECM 31, which indicates that a brake pedal has been released. Of course, the controller 50 may make such determination based on received signals such as signals indicative of changing velocity/acceleration or other suitable signals. If the controller 50 determines that the vehicle 10 is not starting or started, the method 500 advances to block 618 in which controller 50 continues to operate the auxiliary pump 34 to maintain pressure in the hydraulic circuit 52.

At Time D in FIG. 7, the controller 50 receives a signal that the vehicle 10 is in the process of being started. As such, the method 500 advances to block 614. The drive unit 30 begins to crank at time period 710 and drive unit 30 output RPM 702 increases between Time D and Time E. As the drive unit 30 begins to crank, the main pump 56 begins to operate and increase hydraulic pressure in the control circuit 52. In particular, the hydraulic pressure 704 of the first clutch 71 and second clutch 75 increase.

At Time E in FIG. 7, the method 500 advances to block 620 in which the controller 50 disables or turns off the auxiliary pump 34 to reset the auxiliary hydraulic pressurization system 24 for future stops of the vehicle 10 and to allow energy storage unit 45 to be recharged. In some embodiments, the controller 50 waits for expiration of a dwell time before turning off the auxiliary pump 34 to allow the main pump 56 to develop normal operating pressures after the drive unit 30 is turned back on.

Once the auxiliary pump 34 is turned off, the drive unit 30 output RPM 702 returns to an idle speed and the main pump 56 provides the necessary hydraulic pressure to the control circuit 52. At Time F in FIG. 7, the controller 50 effectively disables the engine start-stop control process and method 500 returns to block 502 in which the controller 50 monitors whether the vehicle 10 is in a stop condition or is in the process of stopping.

In some embodiments, when the methods 400, 500 are being executed, the controller 50 may communicate with the ECM 31 to reduce output torque from the drive unit 30 to ease the transition between Time D and Time F. The controller 50 may communicate these torque commands over a communication link (e.g., J-1939 data link) to the ECM 31.

In several embodiments, a time delay mechanism can be executed by the controller 50 when executing methods 400, 500. For instance, when a vehicle 10 is operating in a parking lot, traffic jam, or otherwise repeatedly stopping and starting, the time delay mechanism can prevent methods 400, 500 from being executed. Thus, after blocks 616 and 620 in method 500, the controller can enable the time delay mechanism to a certain time limit, e.g., 30 seconds, before restarting method 500. In another embodiment, the controller 50 can monitor the vehicle speed and before restarting methods 400, 500, the controller 50 can determine if vehicle speed exceeds a threshold. In a further embodiment, if the vehicle 10 has moved a certain distance (e.g., 3 feet), the controller 50 can initiate the time delay mechanism for a certain time delay (e.g., 60 seconds) before it will restart the methods 400, 500. The above-referenced time delays, speeds, etc. are only intended to be examples and not limiting to the scope of this disclosure.

In an alternative embodiment, one of the two clutch pressures of the first clutch 71 and second clutch 75 can be reduced to a level other than that shown by the hydraulic pressure 704 curve in FIG. 7. The one clutch pressure may be reduced to a pressure that is less than the hydraulic pressure 706 corresponding to the third, partially applied clutch. In this instance, the reduced clutch pressure of the one clutch, e.g., either the first clutch 71 or the second clutch 75, can allow a torque converter, for example, to slip and thereby reduce the load applied to a starter (not shown) on the drive unit 30. To achieve this reduced clutch pressure, the controller 50 can command or send a signal to the hydraulic control circuit 52 via one of the aforementioned pressure switches or control valves to reduce this pressure.

Referring to FIG. 8, a different embodiment is shown in which the engine start-stop control process cannot be enabled in block 512. Instead, one or more of the conditions set forth in blocks 504, 506, and 508 may not be satisfied such that the method 500 advances to block 510 in which the controller 50 executes instructions in accordance with a reduced engine load at stop method, similar to that as described above. Referring to FIG. 8, a graphical representation illustrates this embodiment in which a first curve 802 represents drive unit 30 output RPM, a second curve 804 represents hydraulic pressure in the second clutch 75, a third curve 806 represents hydraulic pressure in the first clutch 71, and a fourth curve 808 represents hydraulic pressure in the third, oncoming clutch 74.

If, for example, the controller 50 determines in block 506 that it cannot turn off the drive unit 30, the method 500 advances to block 510. At Time A in FIG. 8, the controller 50 communicates with the control circuit 52 to fill the third clutch 74 to resist rollback when the vehicle 10 comes to a stop. In doing so, the controller 50 also communicates with the control circuit 52 to reduce the hydraulic pressure 806 of the first clutch 71 to a holding level. At this pressure level, the first clutch 71 may be partially filled and begins to slip. This same pressure level may correspond to about the hydraulic pressure level 704 of the first clutch 71 and second clutch 75 and the hydraulic pressure 706 of the third clutch 74 during time period 716 of FIG. 7 (i.e., further corresponding to the output pressure level or capability of the auxiliary pump 34). In this state, the transmission 22 is operating in a partial neutral to improve fuel economy. However, since the first clutch 71 is partially filled, the transmission 22 is configured to react more quickly to a driver demand to shift into drive.

In a related aspect, the controller 50 can release the first clutch 71 completely so that the transmission 22 enters the neutral state. While the second clutch 75 is still filled at the hydraulic pressure 804 in FIG. 8, the transmission 22 cannot react as quickly to driver demand since the first clutch 71 needs to be filled completely. Thus, the controller 50 may need to request less output torque from the drive unit 30 to more easily transition back into drive. In doing so, the hydraulic pressure 808 of the third, oncoming clutch 74 is reduced at about the same as the hydraulic pressure 806 of the first clutch 71 increases to its operating condition in drive.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method of controlling a vehicle, comprising;
providing a drive unit and a drive unit controller for controlling the drive unit;

providing a transmission, a transmission casing, a transmission controller for controlling the transmission, a hydraulic control system of the transmission, a main pump of the hydraulic control system, and an auxiliary hydraulic pressurization system;

externally mounting the auxiliary hydraulic pressurization system to the transmission casing;

fluidly coupling the auxiliary hydraulic pressurization system to the hydraulic control system;

receiving a stop condition signal indicative of the vehicle being in a stop condition or in a process of stopping condition, wherein the stop condition signal indicates that a velocity of the vehicle is less than one of a stopping velocity and a stopped velocity, and is not greater than either one of the stopping velocity or the stopped velocity;

activating the auxiliary hydraulic pressurization system in response to the signal;

regulating a hydraulic pressure in the hydraulic control system of the transmission with the activated auxiliary hydraulic pressurization system;

disabling the drive unit in response to the regulated hydraulic pressure, where the disabling of the drive unit induces a main pump of the hydraulic control system to stop providing hydraulic pressure to the hydraulic control system;

requesting a clutch to be filled with hydraulic pressure from the hydraulic control system;

applying at least partially the clutch with hydraulic pressure to substantially lock an output of the transmission; and maintaining the hydraulic pressure in the hydraulic control system at a hold pressure with the auxiliary hydraulic pressurization system;

wherein, the auxiliary hydraulic pressurization system is activated only in response to the stop condition signal when the vehicle is in a stop condition or in the process of stopping and is not activated during conditions of the vehicle other than the stop condition or the process of stopping condition.

2. The method of claim 1, further comprising performing one or more conditional determinations before activating the auxiliary hydraulic pressurization system.

3. The method of claim 2, wherein the performing step comprises:
determining if an energy storage unit of the vehicle comprises sufficient charge; and
determining if the transmission controller can request to the drive unit controller to disable the drive unit.

4. The method of claim 2, further comprising:
providing a set of executable instructions in the transmission controller, the set of executable instructions including a reduced engine load at stop process;
determining that the one or more conditional determinations is not satisfied;
enabling the reduced engine load at stop process; and
executing the reduced engine load at stop process.

5. The method of claim 1, further comprising activating a solenoid valve of the hydraulic control system to reduce the hydraulic pressure in the hydraulic control system.

6. The method of claim 4, wherein the solenoid valve is activated before the drive unit is disabled.

7. The method of claim 1, further comprising:
receiving a second signal indicative of the vehicle starting;
enabling the drive unit to drive a main pump of the transmission;
deactivating the auxiliary hydraulic pressurization system after the drive unit is enabled; and
regulating the hydraulic pressure in the hydraulic control system with only the main pump to move the vehicle from the stopped condition or the stopping condition.

8. A method of controlling a transmission of a vehicle, comprising:
providing a drive unit for powering the vehicle, and a drive unit controller for controlling the drive unit;
providing a transmission controller for controlling the transmission, a transmission housing, a hydraulic control system including a main pump and a hydraulic control circuit, a plurality of clutches for providing a plurality of selectable gear or speed ratios, and an auxiliary hydraulic pressurization system;
providing a first set and a second set of executable instructions stored in a memory unit of the transmission controller, the first set of executable instructions related to an engine start-stop control process and the second set of executable instructions related to a reduced engine load at stop control process;
externally mounting the auxiliary hydraulic pressurization system to the transmission housing;
fluidly coupling the auxiliary hydraulic pressurization system to the hydraulic control system;
receiving a signal indicative of the vehicle being in a stop condition or coming to a stop condition;
determining if one or more conditions satisfy one or more predefined thresholds;
enabling either the first set or second set of executable instructions based on the result of the determining step;
wherein, if the first set of executable instructions is enabled:
activating the auxiliary hydraulic pressurization system in response to the signal;
regulating a hydraulic pressure in the hydraulic control system of the transmission;
disabling the drive unit, where the disabling of the drive unit induces a main pump of the hydraulic control system to stop providing hydraulic pressure to the hydraulic control system;
requesting another of the plurality of clutches to be at least partially filled with hydraulic pressure before the drive unit is disabled;
substantially locking an output of the vehicle with at least three of the plurality of clutches receiving hydraulic pressure, where the hydraulic pressure of at least two of the plurality of clutches is greater than the hydraulic pressure of the at least partially filled clutch; and
maintaining the hydraulic pressure in the hydraulic control system at a hold pressure with the auxiliary hydraulic pressurization system.

9. The method of claim 8, further comprising;
providing hydraulic pressure to at least three of the plurality of clutches before the disabling the drive unit, wherein the hydraulic pressure in two of the plurality of clutches is approximately the same as the hydraulic pressure in the hydraulic control system, and the hydraulic pressure in the third of the plurality of clutches is less than the hydraulic pressure of the other two clutches; and
energizing a solenoid before the activating step to reduce the hydraulic pressure in the hydraulic system of the transmission.

10. The method of claim 9, further comprising reducing the hydraulic pressure in one of the two clutches to a hydraulic pressure less than the hydraulic pressure of the third clutch.

11. The method of claim 8, wherein the determining step comprises;
determining if an energy storage unit of the vehicle comprises sufficient charge; and
determining if the transmission controller can request to the drive unit controller to disable the drive unit.

12. The method of claim 8, further comprising activating a solenoid valve of the hydraulic control system to reduce the hydraulic pressure in the hydraulic control system before the drive unit is disabled.

13. The method of claim 11, wherein the solenoid valve is activated before the auxiliary hydraulic pressurization system is activated.

14. The method of claim 8, further comprising:
receiving a second signal indicative of the vehicle starting; and
enabling the drive unit to drive a main pump of the transmission.

15. The method of claim 14, further comprising deactivating the auxiliary hydraulic pressurization system after the drive unit is enabled.

16. The method of claim 14, further comprising disabling the transmission controller from executing the first set of executable instructions.

17. The method of claim 8, further comprising:
providing an energy storage unit electrically coupled to the drive unit;
receiving a charge signal from a sensor detecting a charge status of the energy storage unit;
comparing the charge signal to a charge threshold to determine if the energy storage unit has sufficient charge to power the auxiliary hydraulic pressurization system.

18. The method of claim 8, wherein if the second set of executable instructions is enabled:
requesting an unfilled clutch to be at least partially filled with hydraulic pressure, where the unfilled clutch comprises one of the plurality of clutches;
maintaining the drive unit in an on state and the auxiliary hydraulic pressurization system in a deactivated state;
requesting a decrease of hydraulic pressure in a filled clutch, where the filled clutch is one of at least two of the plurality of clutches that is filled prior to the receiving step; and
decreasing the hydraulic pressure in the filled clutch until the hydraulic pressure of the filled clutch is less than the hydraulic pressure of the previously unfilled clutch.

19. A powered vehicle, comprising:
a drive unit having an on state and an off state, where in the on state the drive unit provides rotational power and in the off state the drive unit does not provide rotational power;
a transmission having a housing and operably coupled to the drive unit including a hydraulic control system and a plurality of selectably engageable clutches, the hydraulic control system including a hydraulic control circuit and a main pump driven by the drive unit when the drive unit is in the on state to produce hydraulic pressure in the hydraulic control circuit;
a controller for controlling the transmission, the controller including a memory unit and a processor, where the controller is disposed in electrical communication with the drive unit and the hydraulic control system; and
an auxiliary hydraulic pressurization system externally mounted to the housing and coupled to the hydraulic control circuit, the auxiliary hydraulic pressurization system adapted to only produce hydraulic pressure in the hydraulic control circuit when the drive unit is in the off state;
wherein the memory unit of the controller includes a set of instructions stored therein which are executable by the controller to receive a stop condition signal indicative of the drive unit being in the off state, activate the auxiliary hydraulic pressurization system only in response to the stop condition signal, regulate the hydraulic pressure in the hydraulic control system of the transmission, disable the drive unit to the off state, apply at least one of the plurality of clutches with hydraulic pressure to substantially lock an output of the transmission, and maintain the hydraulic pressure in the hydraulic control system at a hold pressure with the auxiliary hydraulic pressurization system;
wherein, if the hydraulic pressure drops below the hold pressure during the maintaining step, the drive unit is returned to the on state to induce the main pump of the hydraulic control system to provide hydraulic pressure to the hydraulic system;
further wherein, when the drive unit is not in its off state, the auxiliary hydraulic pressurization system is not activated.

20. The powered vehicle of claim 19, further comprising an energy storage unit for powering the auxiliary hydraulic pressurization system.

21. The powered vehicle of claim 19, wherein the set of instructions stored in the memory unit include instructions executable by the controller to receive a charge status of the energy storage unit and determine if the charge status exceeds a charge threshold to enable the auxiliary hydraulic pressurization system to be activated.

22. The powered vehicle of claim 19, further comprising a solenoid valve of the hydraulic control circuit, the solenoid valve being actuable to reduce the hydraulic pressure in the hydraulic control circuit;
wherein, the set of instructions stored in the memory unit include instructions executable by the controller to actuate the solenoid valve before the auxiliary hydraulic pressurization is activated.

23. The powered vehicle of claim 19, wherein the set of instructions comprises a second set of instructions related to a reduced engine load at stop process, the second set of instructions stored in the memory unit and being executable by the controller when at least one precondition is not satisfied after the controller receives the signal indicative of the drive unit being in a stop condition.

* * * * *